`United States Patent Office`

3,451,947
Patented June 24, 1969

3,451,947
SELECTIVE CRACKING CATALYST
Malden Ward Michael, Stamford, Conn., assignor to American Cyanamid Company, Stamford, Conn., a corporation of Maine
No Drawing. Filed May 5, 1966, Ser. No. 547,737
Int. Cl. B01j 11/40, C10g 11/04
U.S. Cl. 252—453                          9 Claims This invention relates to a process for preparing catalysts employed in hydrocarbon conversion processes and to the catalysts so prepared. The invention also relates to such hydrocarbon conversion processes employing the catalysts of this invention. More particularly, the invention relates to the method of preparation of a catalyst composition (1) containing an amorphous alumino silicate cogel which contains the salt of a cation of preferably the alkaline earth and/or rare earth metals, and (2) admixed with a low alumina.

Alumina and silica alumina catalysts are well known for the treatment of mineral oils. Such catalysts are known to produce relatively large amounts of olefinic, isoparaffinic and cyclic hydrocarbons. Such catalysts are ordinarily desirable in the manufacture of gasolines having a high octane rating. In addition to silica-alumina type catalysts, silica-magnesia catalysts are known for producing increased quantities of olefinic and isoparaffinic hydrocarbons and an increasing amount of hydrocarbons boiling in the 200° F.–200° F. range. Ordinary silica-alumina catalysts are more normally stable and are useful for producing gasolines having higher octane rating than those obtained from a silica-magnesia type catalyst. However, silica-magnesia catalysts normally produce less degradation of feed stock into the low grade products such as carbon and coke with a resulting higher yield of gasoline.

Composits of silica-alumina and magnesia are well-known and have been employed in the catalytic treatment of petroleum hydrocarbons, and such composites ordinarily have the advantage of producing gasolines having a high octane rating and good yields. Such catalysts however suffer from the deficiency of not affording a desirable product distribution. Additionally, composites of silica-alumina and magnesia suffer a rapid decline in regenerability during use.

In the past, it has been generally recognized that the amorphous alumina and amorphous alumino silicates when characterized by a fine pore volume are superior in activity to low alumina catalysts. However, the low stability to regeneration processes made the fine pore volume amorphous alumina unsuitable and therefore less desirable for purposes of cracking, for example. Also, crystalline alumina compositions, such as crystalline alkaline metal alumino silicates of the various zeolites, have proven to exhibit both a high activity and a reasonable degree of stability to regeneration processes.

Also, although the manufacture of synthetic catalysts has been primarily previously directed to the preparation of composites of silica alumina to obtain maximum interaction of the alumina with the silica, by employing a process of reacting alumina-producing solutions and silica-producing solutions together under various conditions to achieve the formation of intimate cogel admixture of crystalline silica and alumina, a more recent development set forth in U.S. Patent No. 3,120,496 emphasizes the importance of controlling conditions in a manner which will effectively minimize the content of cogelled alumina, in order to obtain a more selective conversion catalyst.

It is an object of this invention to obtain an amorphous catalytic composition having a high degree of stability to regeneration.

Another object of this invention is to obtain a process for producing the above composition of this invention.

Another object of this invention is to obtain a conversion process which selectively and efficiently reduces production of hydrocarbons having less than about 4 carbon atoms.

Other objects of this invention become apparent on the above and following disclosure.

The objects of this invention are obtained by subjecting a cogel of alumina and silica having an alumina content ranging from about 8% up to about 30% by weight to an ion exchange procedure in which sodium cations from the cogel are at least partially replaced by non-Group I cations typically from any of Groups II, III, IV, V, VI, VII, and VIII, said groups also including the transition metals, but in the preferred embodiment cations solely selected from the group consisting of alkaline earth metals and rare earth metals, and admixing the cogel hydrogel with a hydrogel of a low alumina composition; the term "hydrogel" as used herein includes either (1) a conventional hydrogel or (2) a reconstituted aqueous xerogel. The low alumina composition may be admixed with the cogel either before or after the ion exchange procedure. The cogel of alumina and silica may be obtained by any appropriate process, but preferably is obtained by reacting a sodium silicate composition with aluminum sulfate in respective amounts sufficiently to obtain a cogel of alumina and silica having an alumina content ranging from about 8% up to about 30% by weight, and subsequently removing the sodium cations from the cogel salts (which include a sodium alumina silicate complex) by an ion exchange procedure described above. It is critical, however, that the cogel of the process of this invention contain at least about 8% and not more than about 30% of alumina by weight. Also, the cogel is preferably dewatered to from about 7% to about 10% prior to admixing. Preferably the low alumina is substantially free of sodium ions prior to admixing with the cogel.

In the preferred process for producing the cogel, the aluminum sulfate is employed in an amount sufficiently to obtain a pH of from at least about pH 5 up to about pH 11.5 at a temperature at least sufficiently low to obtain a cogel which is characterized by a xerogel derived therefrom having a pore volume of from about 0.05 up to 0.50 cc./gm. The preferred cogel contains an alumina content from about 10% to about 15% by weight, and is characterized by a xerogel thereof having a pore volume of from 0.2 cc./gm. to 0.35 cc./gm.

Also in the preferred process, the aluminum sulfate is employed in amounts sufficient to obtain a pH of at least about pH 9, and the sodium silicate composition contains $SiO_2$ and $Na_2O$ in a ratio ranging from at least about 3.10:1 up to about 3.50:1 by weight.

The low alumina ingredient of the applicant's composition of this invention may be prepared by any appropriate method such as the conventional methods employed by industry, and includes silica-alumina catalyst having from about 8% to about 15% alumina on a dry-weight basis.

The composition of this invention normally contains from about 10% to about 70% of the substantially sodium-ion-free, amorphous alumino silicate cogel by weight, and the balance thereof of low alumina by weight. The preferred composition contains from about 25 to about 60% of the cogel, and from about 75 to about 40% of the low alumina.

It has been unexpectedly discovered that the replacement of the sodium cations of the cogel by other cations selected from alkaline earth metals and/or rare earth metals obtains a catalyst having improved stability and having a high degree of conversion selectivity decreasing the conversion to hydrocarbons having less than about 4 carbon atoms i.e. the catalyst produces more gasoline, and less hydrocarbon gases of four or less carbon atoms. It has been further unexpectedly discovered that the high degree of selectivity is retained, and greater stability is imparted by admixing therewith a substantial quantity of low alumina.

The preferred cation for exchanging with the sodium ions of the cogel is the cation of calcium. The ion exchange step may be repeated two or more times, and may be either before and/or after admixing the cogel with the low alumina. Example I below ion exchanges before whereas Example IV ion exchanges after the admixing of the low alumina. Both Examples I and IV repeat the ion exchange step several times.

The following examples are solely for purposes of illustration, and are intended to limit the invention only in so far as the appended claims are limited.

Example I

A fine pore 13% $Al_2O_3$ (balance silica) catalyst containing zeolitic material is prepared as follows:

1520 grams "N" brand sodium silicate containing 435 grams silica is added to a mixing pot containing 18 pounds of water and cooled to 18° C. To this is added with good agitation over a period of 30 minutes, 370 grams aluminum sulfate containing 65 grams alumina in 1000 grams water. The mixture gradually thickens to a gel at about pH 10.8. The pH after all of the alum solution is added was 5.3 and the temperature 20° C. The gel is dewatered on a filter crock and the sodium exchanged with rare earth chloride solution in the following steps, all at room temperature:

(1) The filter cake is reslurried in 10 pounds of a 2% rare earth chloride solution and allowed to stand overnight.
(2) The material is dewatered, and the resulting cake reslurried with 10 pounds of a 2% rare earth chloride solution and allowed to stand for 2 hours.
(3) Step (2) is repeatetd.
(4) Step (1) is repeated.
(5) Step (2) is repeated two more times.
(6) Step (1) is repeated.
(7) The material is dewatered and washed free of sulfates.

Example II

A medium pore low alumina catalyst containing 11% $Al_2O_3$ (balance silica) is prepared by a conventional alum ammonia process as follows:

1560 grams N brand sodium silicate containing 440 grams silica is added to 18 pounds of water in a mixing pot and heated to 50° C. Twenty-five percent sulfuric acid is added over a period of 40 minutes with good agitation to a pH of 5.5. 785 grams aluminum sulfate containing 55 grams $Al_2O_3$ is mixed with 465 grams water and added to the mixture over a period of 10 minutes. Fourteen percent ammonia is then added to a pH of 5.5. After ten minutes' aging, the material is filtered and washed on a filter crock until essentially free of deleterious salts such as sodium sulfates.

Example III

Filter cakes from Examples I and II are thoroughly mixed together in such proportions that the finished catalyst will contain equal portions of each (dry basis). The mix is tray dried overnight at about 300° F. (about 150° C.), ground and washed free of chlorides. It is then redried and calcined at 1100° F. for one hour (calcination is not necessary for preparation of the catalyst, but is merely necessary to prepare a catalyst for testing purposes as follow); the finished catalyst has a surface area of 461 m.$^2$/gm., a pore volume of 0.41 cc./gm. and contains 4.5% rare earth oxides.

Example IV

Material prepared as in Example I but *not* exchanged with rare earth chloride solution is mixed with cake prepared in Example II so that the finished material would contain 50% of each (solids basis). The combined mixture is then exchanged with rare earth chloride solution as outlined in Example I. The material is then dried, washed free of chlorides, redried and calcined one hour at 1100° F. The finished catalyst has a surface area of 496 m.$^2$/gm. pore volume of 0.55 cc. per gram and contained 6.7% rare earth oxides.

Examples III and IV are steamed for 17 hours at 576° C. 1 atmosphere steam, and 17 hours at 750° C. and 1 atmosphere steam, and the activity and selectivity towards gasoline production determined in the AGC unit. This test, described in the Manual of Test Methods for Fluid Cracking Catalysts, Refinery Chemicals Department, American Cyanamid Co., was modified so that the process time is changed from 60 minutes to 15 minutes, and the space velocity increases from 1.4 to 2.4. Results are shown in table below. The column "C5+, 400° F." yields are given as factored to the yield from the low alumina standard at the same conversion level, i.e., if the new catalyst should yield 45% at a given conversion and the standard 40% at the same conversion, the factor would be 1.12.

TABLE

| Example | Steam, ° C. | A | G | C | ABD | Wt. percent conversion | C5+ 400° F. | C |
|---|---|---|---|---|---|---|---|---|
| 3 | 576 | 60 | .41 | 1.15 | .635 | 58 | 1.25 | .76 |
| 3 | 750 | 28.3 | .76 | 1.33 | .720 | 34 | 1.05 | .59 |
| 4 | 576 | 63 | .87 | .94 | .570 | 58 | 1.07 | .81 |
| 4 | 750 | 39.6 | .70 | 1.55 | .646 | 42 | 1.09 | .76 |

The above data show both catalysts produce more gasoline, less hydrocarbon gases of 4 or less carbon atoms, and less carbon than the low alumina standard.

It is within the scope of this invention to employ equivalents of various ingredients and/or steps as would be obvious to the skilled artisan. The invention disclosed and illustrated above is limited only to the extent of the appended claims.

I claim:

1. A composition comprising (1) a substantially sodium-ion-free amorphous aluminosilicate cogel characterized by a pore volume ranging from about 0.05 cc./g. to about 0.50 cc./g. in an amount ranging from an amount sufficient to be effective up to about 70% by weight of said total composition, and containing from about 2 to 15% of a minor amount of salt of a non-Group I cation, other than aluminum, said alumina content ranging from about 8% up to about 30% by weight of said cogel, and (2) a low alumina composition, containing from about 8 to 15% of alumina, in an amount ranging from about 90% to about 30% by weight of said total composition.

2. A composition according to claim 1 in which said cation is selected from the group consisting of alkaline earth metals and rare earths, and in which said alumina composition comprises silica alumina, said cogel being in an amount ranging from about 10% up to said 70% by weight of said total composition.

3. A composition according to claim 1 in which said pore volume ranges from about 0.2 to about 0.35 cc./g., in which said cogel ranges from about 25% to about 60%, in which said low alumina ranges from about 75% to about 40%, and in which said cogel has an alumina content ranging from about 10% up to about 15% by weight.

4. A composition according to claim 3 in which said cation is selected from the group consisting of alkaline earth metals and rare earths, and in which said alumina composition comprises silica alumina.

5. A composition according to claim 3 in which said second cation comprises calcium.

6. A process comprising reacting a sodium silicate composition with aluminum sulfate in respective amounts sufficiently to obtain an amorphous cogel of alumina and silica having an alumina content ranging from about 8% up to about 30% by weight and having a pore volume of from about 0.05 cc./g. to about 0.50 cc./g., substantially removing sodium cations from said cogel comprising ion exchanging with non-Group I cation, other than aluminum and admixing said cogel with a low alumina composition, said process being sufficient to produce a composition according to claim 1.

7. A process according to claim 6 in which aluminum sulfate is employed in an amount sufficiently to obtain a pH of from at least about pH 5 up to about pH 11.5 at a temperature sufficiently low to obtain said cogel, in which said alumina content ranges from about 10% to about 15% by weight, and in which said cation is selected from the group consisting of the alkaline earth metals and the rare earth metals.

8. A process according to claim 7 in which said alumina sulfate is added in an amount sufficient to obtain a pH of at least about pH 9, in which said sodium silicate composition contains $SiO_2$ and $Na_2O$ in a ratio ranging from at least about 3.10:1 up to about 3.50:1 by weight, and in which said second cation comprises calcium.

9. A process according to claim 6 in which said cogel and said low alumina composition are each a hydrogel when admixed.

References Cited

UNITED STATES PATENTS

| | | | |
|---|---|---|---|
| 2,779,742 | 1/1957 | Emmett | 252—455 |
| 3,242,100 | 3/1966 | Harnsberger et al. | 252—453 X |
| 3,260,681 | 7/1966 | Sanford et al. | 252—455 |
| 3,277,018 | 10/1966 | Plank et al. | 208—120 X |

DANIEL E. WYMAN, *Primary Examiner.*

C. F. DEES, *Assistant Examiner.*

U.S. Cl. X.R.

252—455

PO-1050
(5/69)

UNITED STATES PATENT OFFICE
CERTIFICATE OF CORRECTION

Patent No. 3,451,947            Dated June 24, 1969

Inventor(s) MALDEN WARD MICHAEL

It is certified that error appears in the above-identified patent and that said Letters Patent are hereby corrected as shown below:

Column 1, Line 29, the second "200°F." should read -- 400°F. --; and "Ordinary" should read -- Ordinarily -- as shown on Page 1, Line 20 of the original specification as filed.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents